Feb. 16, 1960 L. B. EATON 2,925,171
INFUSION BAG AND METHOD OF MAKING THE SAME
Filed Oct. 13, 1958 3 Sheets-Sheet 1
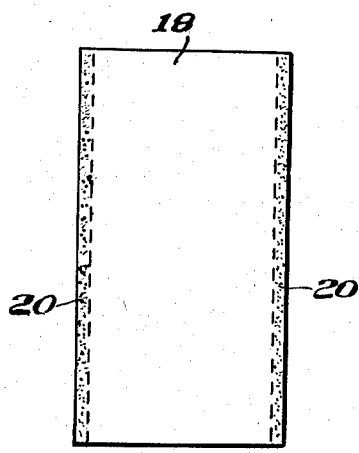
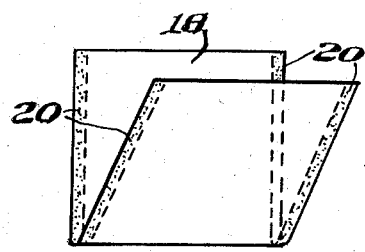
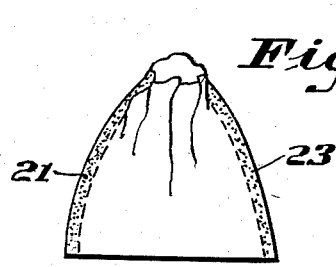
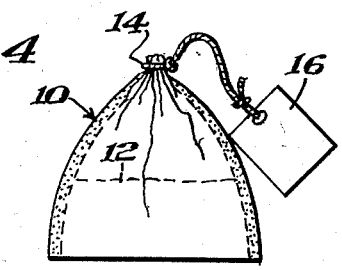
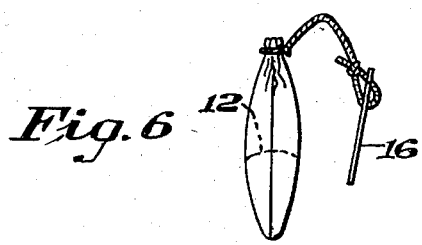
INVENTOR
Lewis B. Eaton
BY
Robert R. Churchill
ATTORNEY Feb. 16, 1960 L. B. EATON 2,925,171
INFUSION BAG AND METHOD OF MAKING THE SAME
Filed Oct. 13, 1958 3 Sheets-Sheet 2

INVENTOR
LEWIS B. EATON
BY Robert A. Churchill
ATTORNEY

Feb. 16, 1960 L. B. EATON 2,925,171
INFUSION BAG AND METHOD OF MAKING THE SAME
Filed Oct. 13, 1958 3 Sheets-Sheet 3
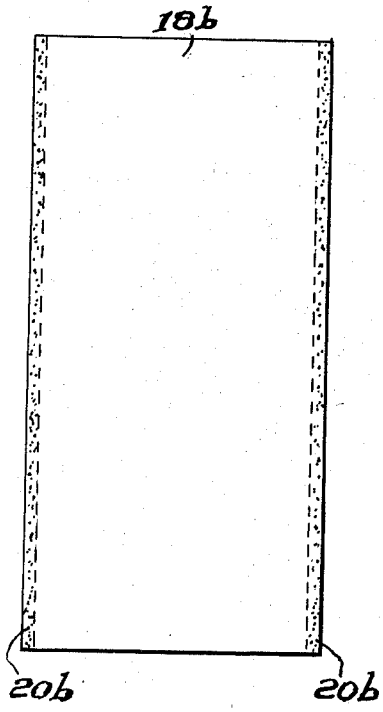
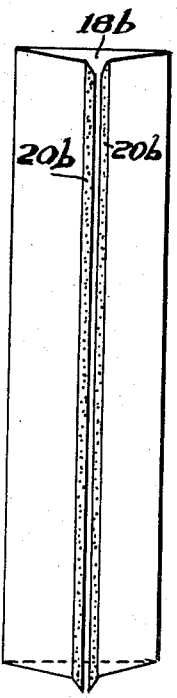
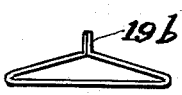
Fig. 14  Fig. 15  Fig. 16
Fig. 17
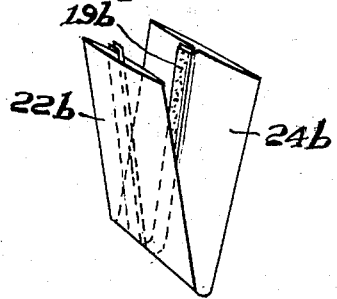
Fig. 18
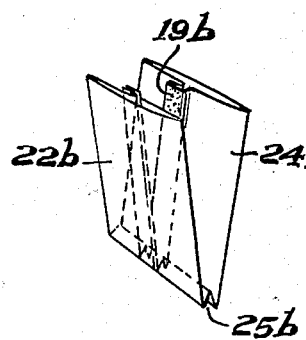
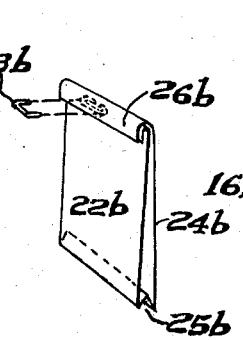
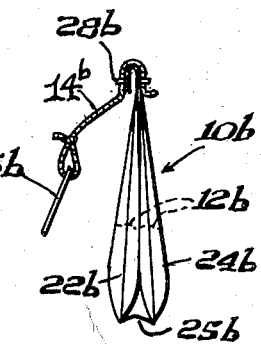
Fig. 19  Fig. 20  Fig. 21
INVENTOR
LEWIS B. EATON
BY
Robert R. Churchill
ATTORNEY United States Patent Office 2,925,171
Patented Feb. 16, 1960

2,925,171

INFUSION BAG AND METHOD OF MAKING THE SAME

Lewis B. Eaton, Hingham, Mass., assignor to Pneumatic Scale Corporation, Limited, Quincy, Mass., a corporation of Massachusetts Application October 13, 1958, Serial No. 766,862

18 Claims. (Cl. 206—.5)

This invention relates to an infusion bag and to a method of making the same.

The invention has for an object to provide a novel and improved infusion bag and to a method of making the same and which is capable of infusion of water extractable commodities in a superior and highly efficient manner.

A further object of the invention is to provide an infusion bag of the character specified wherein the bag material embodies a thermoplastic fibrous material along only the confronting faces of the marginal edges to be heat sealed leaving the remainder of the sheet free of thermoplastic fibrous material whereby to permit faster and superior extraction of the water extractable commodity.

With these general objects in view and such others as may hereinafter appear, the invention consists in the infusion bag and method of making the same as hereinafter described and particularly defined in the claims at the end of this specification.

In the drawings illustrating the preferred embodiment of the invention:

Fig. 1 is a developed view of a sheet of bag making material used in forming the present bag;

Fig. 2 is a similar view showing the sheet folded transversely of its length to present the longitudinal marginal side edges thereof in confronting relation;

Fig. 3 is a plan view showing the confronting marginal edges heat sealed to form a flat open mouth container;

Fig. 4 is a front elevation of a filled bag showing the mouth portion thereof bunched or crimped together forming a pouch type bag;

Fig. 5 is a similar view showing the mouth portion provided with a string closure, the string providing a handle having a tag at the free end thereof;

Fig. 6 is a side elevation of the bag shown in Fig. 5;

Fig. 14 is a developed view of a sheet of bag making material used in forming another modified form of infusion bag embodying the present invention;

Fig. 15 is a similar view showing the sheet of Fig. 13 folded longitudinally to present the longitudinal marginal edges thereof in confronting relation;

Fig. 16 is a plan view showing the confronting marginal edges heat sealed to form a tube;

Fig. 17 is a similar view showing the upstanding heat seal folded down flat against the tube;

Fig. 18 is a perspective view showing the tube folded transversely upon itself to form a two-compartment bag;

Fig. 19 is a similar view showing the bottom of the two-compartment bag provided with a pleat;

Fig. 20 is a perspective view of a filled bag showing the top or mouth portion folded down to close the bag; and Fig. 21 is a side elevation of the completed bag showing a handle comprising a string and a tag, the string being stapled to the folded mouth portion to close the mouth and to attach the handle to the bag.

Figure 7:
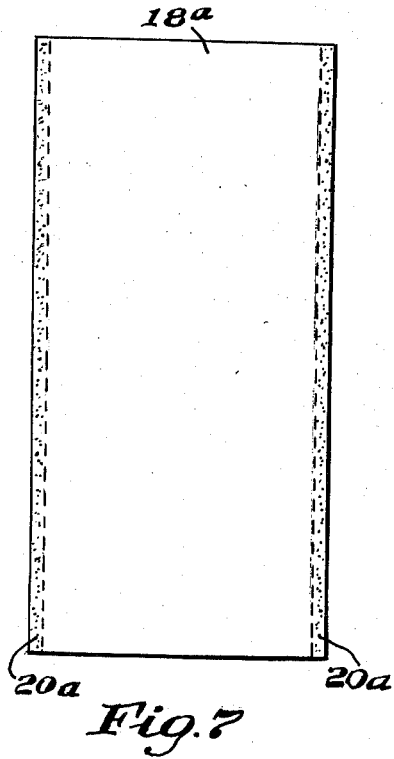
Fig. 7 is a developed view of a sheet of bag making material used in forming a modified form of infusion bag embodying the present invention.

In general the present invention contemplates a novel and improved infusion bag containing a water extractable commodity, such as tea or coffee, herein illustrated as comprising a bag made from a highly water permeable material, preferably a thin sheet of porous filter paper embodying a thermoplastic fibrous material along the edges to be sealed only. In the illustrated embodiment of the invention opposed longitudinal marginal edges only of the sheet are provided with the thermoplastic fibrous material, the latter being more highly concentrated on one surface of the sheet than the other so that in effect only one side of the paper is heat sealable along the longitudinal marginal edges. Thus, in practice such edges are capable of being heat sealed when placed in confronting relation and subjected to heat and pressure to form a bag leaving the remainder of the container free of thermoplastic fibers whereby to permit a faster and superior extraction of the water extractable commodity.

One important feature of the present invention resides in the fact that the fibrous nature of the sheet of porous bag forming material in the areas which are heat sealed is substantially unchanged by the heat sealing operation. In practice the seal is effected by a bonding of the intermingled thermoplastic fibers of the portions of the sheet of bag forming material being sealed together. During the heat sealing operation the fibers are not heated sufficiently to cause them to run together and form a continuous thermoplastic coating or a continuous seal. In practice only sufficient heat is supplied to the area to be heat sealed to soften the thermoplastic fibers in the portions being sealed to render them tacky enough to effectively bond together during the heat sealing operation.

Referring now to the drawings and particularly to Figs. 1–6, the invention is herein illustrated as embodied in a pouch type bag, indicated generally at 10 in Fig. 5, containing a quantity of tea or other water extractable commodity 12 and provided with a string closure 14 which forms a handle having a tag 16 secured to the other end of the string.

The present tea bag is preferably made from an elongated rectangular sheet of a relatively thin, porous filter paper 18 shown in Fig. 1 and embodying a thermoplastic heat sealable fibrous material indicated at 20 along the longitudinal marginal edges and on one side of the paper only.

As shown in Fig. 2, sheet 18 is folded along a transverse medial line to present the marginal side edges 20 embodying the thermoplastic fibers in confronting relation whereupon the marginal side edges are subjected to sufficient heat to render the thermoplastic fibers tacky and sufficient pressure to bond the edges together and form a flat bag as illustrated in Fig. 3 having heat sealed side seams 21, 23. In practice the temperature of the heat applied to the paper in the areas to be sealed together during the heat sealing operation is preferably within a range of from 250° F. to 270° F. The temperature at which the sealing operation is performed may be varied within the above limits depending principally upon the speed at which the bags are sealed. It has been found that the sealing operation may be performed at a temperature of 250° F. at a minimum speed of 80 bags per minute, and at a temperature of 270° F. at a maximum speed of 90 bags per minute. After being provided with a quantity of the infusion material the mouth of the filled bag may then be bunched or crimped together, as shown in Fig. 4, to form a pouch type bag whereupon the crimped mouth portion may be tied by the string 14 to close the mouth and to attach the handle thereto.

In the manufacture of the relatively thin, porous filter paper preferably employed in making the present tea bag, a dilute suspension of non-thermoplastic fibers suspended in a relatively large proportion of water is fed onto a moving screen of a Fourdrinier machine, leaving a mat of the fibers deposited on the screen. The non-thermoplastic fibers are preferably extremely long, non-hydrated fibers loosely formed to produce a very low density paper having many minute interstices between the fibers permitting rapid passage of liquid therethrough but retaining very small solid particles of the water extractable commodity.

In order to render the longitudinal marginal edges of the paper thermoplastic and heat sealable on one side of the mat a second dilute water suspension of low melting point thermoplastic synthetic fibers, such as so-called "Vinyon fibers," is fed onto the screen at a point above the point where the non-thermoplastic fibers are deposited on the screen, the thermoplastic fibers being guided and controlled in a manner such that they are deposited along only the marginal edges of the upper face of the mat. The Vinyon fibers are made up of a copolymer of vinyl acetate and vinyl chloride, and in practice the thermoplastic fibers are preferably of a relatively short length such as to facilitate dispersion of the fibers along the edges of the mat and yet of sufficient length to permit interlocking of the fibers with the underlying non-thermoplastic fibers. In operation the thermoplastic fibers intermingle with the non-thermoplastic fibers along the marginal edges to flow uniformly onto the upper surface of the mat and also through the surface to an extent sufficient to bond them to the non-thermoplastic fibers. Thus, in the dried and finished sheet the top surface of the sheet contains fibers which are predominantly thermoplastic along the marginal edges only thereof. While it is preferred to utilize in the present invention thermoplastic fibers, such as Vinyon fibers, it will be understood that other thermoplastic fibers having similar properties may be utilized.

With respect to the modifications of the present invention illustrated in Figs. 7–13 and Figs. 14–21, hereinafter to be described, it will be understood that the heat sealing operation in each of the modified forms of the invention is similar to that herein described in connection with the form of the invention illustrated in Figs. 1–6. In each case the temperature at which the heat sealing operation is performed is only sufficient to render the thermoplastic fibers tacky.

Figure 11:
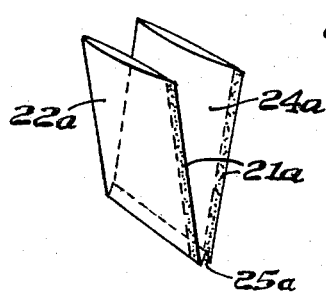
Fig. 11 is a similar view showing the bottom of the two-compartment bag provided with a pleat.
Figure 12:
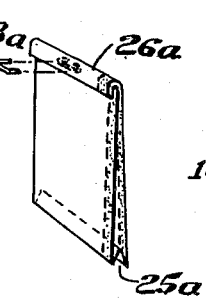
Fig. 12 is a perspective view of a filled bag showing the top or mouth portion folded down to close the bag.
Figure 13:
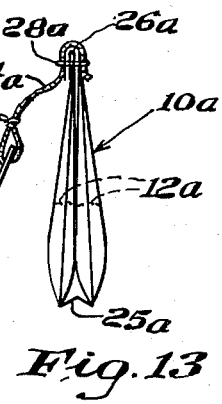
Fig. 13 is a side elevation of the completed bag showing a handle comprising a string and a tag stapled to the folded mouth portion to close the mouth and to attach the handle to the bag.

Referring now to Figs. 7 to 13 illustrating a modified form of the present invention, the modified infusion bag is herein illustrated as embodied in a duplex or two-compartment bag, indicated generally at 10a in Fig. 13, each compartment containing a quantity of tea or other water extractable commodity 12a. As herein shown, the bag may be provided with a handle comprising a length of string 14a having one end attached to the closed mouth of the bag and a tag 16a secured to the other end of the string.

Figure 8:
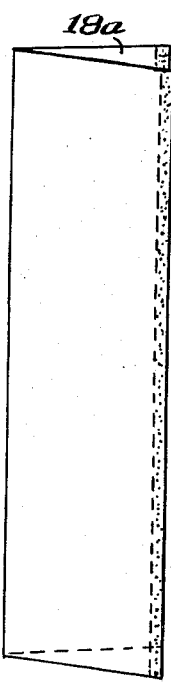
Fig. 8 is a similar view showing the sheet of Fig. 6 folded upon itself longitudinally.
Figure 9:
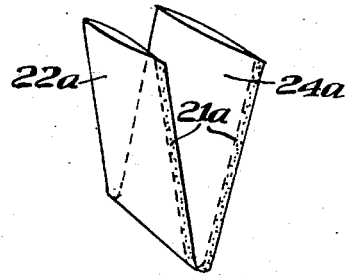
Fig. 9 is a plan view showing the folded sheet of Fig. 7 heat sealed along the longitudinal marginal edge to form a tube.
Figure 10:
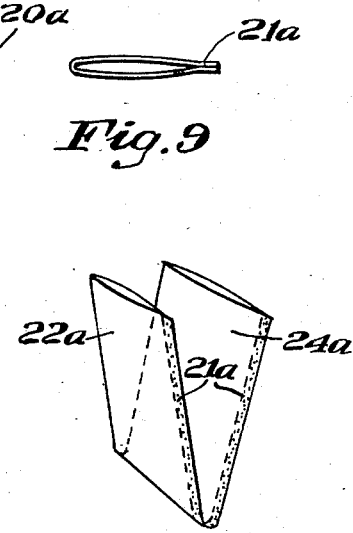
Fig. 10 is a perspective view showing the tube folded transversely upon itself to form a two-compartment bag.

The present tea bag is preferably made from an elongated rectangular sheet of a relatively thin, porous filter paper 18a, shown in Fig. 7, and embodying a thermoplastic heat sealable fibrous material, indicated at 20a, along the longitudinal marginal edges and on one side of the paper only. As shown in Fig. 8, the sheet 18a is folded along a longitudinal medial line to present the thermoplastic marginal edges 20a in confronting relation whereupon the marginal edges are subjected to heat and pressure to seal the edges and to form a flat tube having a longitudinal side seam 21a as illustrated in Fig. 9. The flat tube may then be folded transversely upon itself, as shown in Fig. 10, to form a bag having two compartments 22a, 24a open at the top and heat sealed along one edge. The bottom of the bag may then be provided with a reentrant portion forming a pleat 25a, as illustrated in Fig. 11, to permit expansion of the connected bottom portions of each compartment when provided with a quantity of tea.

After filling the two compartments of the bag with a quantity of tea through the open ends thereof, the mouth portions of both compartments are brought together and folded down to form a closure 26a, as shown in Fig. 12, and the bag end of the string 14a may then be placed over a medial portion of the fold and secured thereto by a staple 28a, as illustrated in Fig. 13, the staple passing through the several plies of the mouth portion and embracing the string on both sides of the fold, as shown, to effect closing of the mouth and attachment of the handle.

Referring now to Figs. 14 to 21 illustrating another modified form of the invention, the modified infusion bag is herein illustrated as embodied in a duplex or two-compartment bag, indicated generally at 10b in Fig. 21, each compartment containing a quantity of tea or other water extractable commodity 12b. As herein shown, the bag may be provided with a handle comprising a length of string 14b having one end attached to the closed mouth of the bag and a tag 16b secured to the other end of the string. The present tea bag is preferably made from an elongated rectangular sheet of a relatively thin, porous, filter paper 18b, as shown in Fig. 14, and embodying a thermoplastic heat sealable fibrous material, indicated at 20b, along the longitudinal marginal edges and on one side of the paper only.

As shown in Fig. 15, the longitudinal marginal portions of the sheet 18b are folded inwardly to present the inner thermoplastic marginal edges 20b of the sheet in confronting relation whereupon the thermoplastic edges are subjected to heat and pressure to seal the edges and to form a flat tube having an upstanding medially disposed seam 19b as shown in Fig. 16. The upstanding seam 19b may then be folded down flat against the tube, as shown in Fig. 17, and the flat tube may then be folded transversely upon itself with the medially disposed seam 19b inside the transverse fold, as shown in Fig. 18, to form a bag having two compartments 22b, 24b open at the top. The bottom of the bag may then be provided with a reentrant portion forming a pleat 25b, as illustrated in Fig. 19, to permit expansion of the connected bottom portions of each compartment when provided with a quantity of tea.

After filling the two compartments of the bag with a quantity of tea through the open ends thereof, the mouth portions of both compartments are brought together and folded down to form a closure 26b, as shown in Fig. 20, and the bag end of the string 14b may then be placed over a medial portion of the fold and secured thereto by a staple 28b, as illustrated in Fig. 21, the staple passing through the several plies of the mouth portion and embracing the string on ends of the folded seam 19b and embracing the string on both sides of the fold, as shown, to effect closing of the mouth and attachment of the handle thereto.

From the above description it will be seen that the present infusion bag made from a thin, porous, filter paper embodying a thermoplastic fibrous material along only the confronting marginal edges to be heat sealed leaves the remainder of the bag material free of thermoplastic fibers enabling more rapid and efficient extraction of the water extractable commodity therethrough. It will also be observed that in practice only sufficient heat is applied during the heat sealing operation to join the thermoplastic fibers along the edges of the paper so that the fibrous character of the infusion bag in the area heated is substantially retained.

This invention is a continuation-in-part of my copending applications, Serial Nos. 545,991, filed November 9, 1955; 545,992, filed November 9, 1955; and 545,855, filed November 9, 1955.

While the preferred embodiment of the invention has been herein illustrated and described, it will be understood that the invention may be embodied in other forms within the scope of the following claims.

Having thus described the invention, what is claimed is:

1. An infusion bag for an infusion material comprising a sheet folded upon itself transversely and heat sealed along the inner confronting marginal edges to form an open mouth bag, and means forming a top closure for the bag, said sheet comprising a thin, porous, fibrous, filter paper having only the the inner confronting faces along two opposing marginal edges thereof provided with a thermoplastic fibrous material, the fibers of said thermoplastic material being intermingled with the fibers of said filter paper only at said marginal edges so that the remaining area of the bag is relatively free of thermoplastic fibers, thus rendering the bag capable of effecting a more rapid and efficient infusion of the infusion material when placed in hot water, the thermoplastic fibrous material along the marginal edges being more highly concentrated on said inner confronting surfaces of the fibrous filter paper than on the outer surfaces of the marginal edges which are substantially free of thermoplastic fibrous material the individual thermoplastic fibers being sufficiently bonded together incident to heating to form a seal without forming a continuous thermoplastic coating at said confronting surfaces.

2. An infusion bag for an infusion material comprising a rectangular sheet folded upon itself transversely of its length and heat sealed along the confronting marginal side edges to form an open mouth bag, said open mouth being bunched together to close the same, and means for retaining the mouth in its closed condition, said sheet comprising a thin, porous, fibrous, filter paper having only the inner face along the opposing longitudinal marginal edges thereof provided with a thermoplastic fibrous material, the fibers of said thermoplastic material being intermingled with the fibers of said filter paper only at said marginal edges so that the remaining area of the bag is relatively free of thermoplastic fibers, thus rendering the bag capable of effecting a more rapid and efficient infusion of the infusion material when placed in hot water, the thermoplastic fibrous material along the marginal edges being more highly concentrated on said inner confronting surfaces of the fibrous filter paper than on the outer surfaces of the marginal edges which are substantially free of thermoplastic fibrous material the individual thermoplastic fibers being sufficiently bonded together incident to heating to form a seal without forming a continuous thermoplastic coating at said confronting surfaces.

3. The method of making an infusion bag containing an infusion material comprising forming an elongated mat of non-thermoplastic fibers and depositing thermoplastic fibers along the longitudinal side edges only of one face of said mat to form a sheet of thin, fibrous, porous filter paper, forming a bag by folding upon itself transversely of its length said sheet of thin, porous, fibrous filter paper with the side edges embodying said thermoplastic fibers positioned in confronting relation, and heat sealing the confronting thermoplastic side edges of said folded sheet to provide an open mouth bag, introducing a quantity of said infusion material into the bag, and then forming a top closure for the mouth of the bag.

4. An infusion bag for an infusion material and comprising a rectangular sheet folded upon itself longitudinally of its length and heat sealed along the confronting longitudinal edge portions to form a tube with the sealed seam extended laterally on one side thereof, said tube being folded upon itself transversely of its length to form two open mouth compartments, and means forming a top closure for the bag, said sheet comprising a thin, porous, fibrous, filter paper having only the inner face along the opposing longitudinal marginal edges thereof provided with a thermoplastic fibrous material, the fibers of said thermoplastic material being intermingled with the fibers of said filter paper only at said marginal edges so that the remaining area of the bag is relatively free of thermoplastic fibers, thus rendering the bag capable of effecting a more rapid and efficient infusion of the infusion material when placed in hot water, the thermoplastic fibrous material along said marginal edges being more highly concentrated on said inner confronting surfaces of the fibrous filter paper than on the outer surfaces of the marginal edges which are substantially free of thermoplastic fibrous material the individual thermoplastic fibers being sufficiently bonded together incident to heating to form a seal without forming a continuous thermoplastic coating at said confronting surfaces.

5. An infusion bag for an infusion material and comprising a rectangular sheet folded upon itself longitudinally of its length and heat sealed along the confronting longitudinal edge portions to form a tube with the sealed seam extended laterally on one side thereof, said tube being folded upon itself transversely of its length to form two open mouth compartments, and means forming a top closure for the bag, said sheet comprising a thin, porous, fibrous filter paper having only the inner face along the opposing longitudinal marginal edges thereof provided with a thermoplastic fibrous material, the fibers of said thermoplastic material being intermingled with the fibers of said filter paper only at said marginal edges so that the remaining area of the bag is relatively free of thermoplastic fibers, thus rendering the bag capable of effecting a more rapid and efficient infusion of the infusion material when placed in hot water, the bottom of said bag being folded inwardly to provide a pleat between the bottom edges of said two compartments to permit expansion of the bag, the thermoplastic fibrous material along said marginal edges being more highly concentrated on said inner confronting surfaces of the fibrous filter paper than on the outer surfaces of the marginal edges which are substantially free of thermoplastic fibrous material the individual thermoplastic fibers being sufficiently bonded together incident to heating to form a seal without forming a continuous thermoplastic coating at said confronting surfaces.

6. An infusion bag as defined in claim 5 wherein the top closure comprises a folded down portion, and fastening means for retaining the closure in its folded position.

7. An infusion bag as defined in claim 6 wherein a handle comprising a string and a tag is attached to the mouth portion of the bag by said fastening means.

8. The method of making an infusion bag containing an infusion material comprising forming an elongated mat of non-thermoplastic fibers and depositing thermoplastic fibers along the marginal edges only of one face of the mat to form a sheet of thin, fibrous, porous, filter paper, forming a bag by folding upon itself longitudinally of its length said sheet of thin, porous, fibrous, filter paper with the marginal edges embodying said thermoplastic fibers positioned in confronting relation, and heat sealing the confronting thermoplastic marginal edges of said folded sheet to form a tube having a lateral seam on one side thereof, folding said tube upon itself transversely of its length to form two open mouth compartments, introducing a quantity of infusion material into said compartments, and then forming a top closure for the bag.

9. The method of making an infusion bag as defined in claim 8 wherein the top closure is formed by bringing the mouth portions of the compartments together and folding the same downwardly, and securing the closure in its folded condition.

10. The method of making an infusion bag as defined in claim 9 which includes the step of folding the bottom of the bag inwardly to form a pleat between the lower ends of said two compartments.

11. An infusion bag for an infusion material comprising a rectangular sheet having the longitudinal marginal portions thereof folded inwardly and the confronting marginal edges heat sealed to form a tube having a medial seam, said tube being folded transversely upon itself with the medial seam within the transverse fold to provide two open mouth compartments, and means forming a top closure for the bag, said sheet comprising a thin, porous, fibrous filter paper having only the inner face along the opposing longitudinal marginal edges thereof provided with a thermoplastic fibrous material, the fibers of said thermoplastic material being intermingled with the fibers of said filter paper only at said marginal edges so that the remaining area of the bag is relatively free of thermoplastic fibers, thus rendering the bag capable of effecting a more rapid and efficient infusion of the infusion material when placed in hot water, the thermoplastic fibrous material along said marginal edges being more highly concentrated on said inner confronting surfaces of the fibrous filter paper than on the outer surfaces of the marginal edges which are substantially free of thermoplastic fibrous material the individual thermoplastic fibers being sufficiently bonded together incident to heating to form a seal without forming a continuous thermoplastic coating at said confronting surfaces.

12. An infusion bag for an infusion material comprising a rectangular sheet having the longitudinal marginal portions thereof folded inwardly and the confronting marginal edges heat sealed to form a tube having a medial seam, said tube being folded transversely upon itself with the medial seam within the transverse fold to provide two open mouth compartments, and means forming a top closure for the bag, said sheet comprising a thin, porous, fibrous, filter paper having only the inner face along the opposing longitudinal marginal edges thereof provided with a thermoplastic fibrous material, the fibers of said thermoplastic material being intermingled with the fibers of said filter paper only at said marginal edges so that the remaining area of the bag is relatively free of thermoplastic fibers, thus rendering the bag capable of effecting a more rapid and efficient infusion material when placed in hot water, the thermoplastic fibrous material along said marginal edges being more highly concentrated on said inner confronting surfaces of the fibrous filter paper than on the outer surfaces of the marginal edges which are substantially free of thermoplastic fibrous material the individual thermoplastic fibers being sufficiently bonded together incident to heating to form a seal without forming a continuous thermoplastic coating at said confronting surfaces, the bottom of said bag being folded inwardly to provide a pleat between the bottom edges of said two compartments to permit expansion of the bag.

13. An infusion bag as defined in claim 12 wherein the top closure comprises a folded down portion, and fastening means for retaining the closure in its folded condition.

14. An infusion bag as defined in claim 13 wherein a handle comprising a string and a tag is attached to the folded mouth portion of the bag by said fastening means, said fastening means extending through the several plies of the bag and the ends of said medial seams and embracing said string on both sides of the closure.

15. The method of making an infusion bag containing an infusion material comprising forming an elongated mat of non-thermoplastic fibers and depositing thermoplastic fibers along the longitudinal marginal edges only of the upper face of the mat to form a sheet of thin, porous, fibrous, filter paper, forming a bag by folding inwardly upon itself the longitudinal marginal portions of said sheet and heat sealing the confronting thermoplastic marginal edges of said folded sheet to form a tube having an upstanding medial seam, folding said seam flat against the tube, folding said tube upon itself transversely of its length to form two open mouth compartments, introducing a quantity of infusion material into said compartments, and then forming a top closure for the bag.

16. The method of making an infusion bag as defined in claim 15 wherein the top closure is formed by bringing the mouth portions of the compartments together and folding the same downwardly, and securing the closure in its folded condition.

17. The method of making an infusion bag as defined in claim 16 which includes the step of folding the bottom of the bag inwardly to form a pleat between the lower ends of said two compartments.

18. An infusion bag as defined in claim 11 in which the thermoplastic fibers are of relatively shorter length than the non-thermoplastic fibers whereby to facilitate dispersion and intermingling of the fibers along the marginal edges of the sheet.

References Cited in the file of this patent

UNITED STATES PATENTS

| | | |
|---|---|---|
| 1,497,174 | Hirschhorn | June 10, 1924 |
| 1,497,276 | Hirschhorn | June 10, 1924 |
| 2,015,972 | Sodergren | Oct. 1, 1935 |
| 2,143,302 | Cross | Jan. 10, 1939 |
| 2,344,369 | Salfisberg | Mar. 14, 1944 |
| 2,364,903 | Howard | Dec. 12, 1944 |
| 2,593,608 | Rambold | Apr. 22, 1952 |
| 2,671,026 | Hirschhorn | Mar. 2, 1954 |